3,655,835
PROCESS FOR THE PREPARATION OF DIMETHYL-THIOPHOSPHITE OR OF ORGANOTHIOPHOSPHONOUS ACID O-MONOMETHYL ESTER
Reinhard Schliebs, Cologne, Flittard, Germany, assignor to Farbenfabriken Bayer Aktiengesellschaft, Leverkusen, Germany
No Drawing. Filed May 5, 1969, Ser. No. 821,995
Claims priority, application Germany, May 20, 1968,
P 17 68 503.9
Int. Cl. C07f 9/16
U.S. Cl. 260—983                          15 Claims

ABSTRACT OF THE DISCLOSURE

Reacting trimethylposphite or organo-phosphonous acid O,O-dimethyl ester with hydrogen sulfide in the presence of a weak organic base (the pKa of which in aqueous solution is about 0.5–8) at a temperature of substantially between about 0–70° C. and a starting pressure of substantially between about 1–65 atmospheres absolute, to form in high yield and purity the corresponding known dimethyl-thiophosphite or organo-thiophosphonous acid-O-mono methyl ester, which are known intermediates useable for the synthesis of known biocidal, especially insecticidal, phosphoric acid esters.

---

The present invention relates to and has for its objects the provision for particular new methods of reacting trimethylphosphite or organo-phosphonous acid O,O-dimethyl ester with hydrogen sulfide in the presence of a weak organic base (the pKa of which in aqueous solution is about 0.5–8) at a temperature of substantially between about 0–70° C. and at a starting pressure of substantially between about 1–65 atmospheres absolute, to form in high yield and purity the corresponding known dimethyl-thiophosphite or organo-thiophosphonous acid O-monomethyl ester, which are known intermediates usable for the synthesis of known biocidal, especially insecticidal, phosphoric acid esters, e.g. in a simple reaction, using readily available starting materials and resulting in outstanding yields and purity, with other and further objects of the invention becoming apparent from a study of the within specification and accompanying examples.

From the literature [cf. I. S. Achmetchanov et al., Dokl. Akad. Nauk, SSSR, (that is, Reports of the Academy of Sciences of the U.S.S.R.) 163, No. 2, p. 362 to 364 (1965)] it is known that diethyl-thiophosphite can be obtained in very good yield by reaction of triethyl-phosphite, hydrogen sulfide and triethyl-amine by adherence to certain conditions (molar ratio triethyl-phosphite: triethyl-amine=2:1, temperature 10° C., duration of introduction of hydrogen sulfide 50 hours), and subsequent distillation under reduced pressure. The above Soviet authors discuss, with respect to this reaction, a mechanism according to which there is formed an ionic addition product of hydrogen sulfide and triethyl-phosphite as intermediate which under the conditions of the distillation (at temperatures under 90° C.) is split into diethyl-thiophosphite and ethanol.

By reason of these particulars, it was to be expected that trimethyl-phosphite (TMP) too could be reacted in analogous manner to give dimethyl-thiophosphite (DMTP). The success of such a reaction would be very significant since up to now no commercially satisfactory process for obtaining DMTP is available, whereas diethyl-thiophosphite may be prepared on an industrial scale even according to other methods.

If, however, trimethyl-phosphite, triethyl-amine and hydrogen sulfide are reacted with one another at 10° C. for 65 hours under the conditions stated above, only a mixture of methyl-mercaptan and methanol is produced when a subsequent distillation is attempted; there remains behind a viscous, evil-smelling residue which, on the basis of its infra-red spectrum, possesses salt-like structure. Dimethyl-thiophosphite is clearly not formed in the reaction (see comparative Example I hereinbelow).

Even when the triethyl-amine is replaced by tri-n-butyl-amine, the reaction proceeds in analogous manner without producing DMTP (see comparative Eample II hereinbelow).

Accordingly, under the conditions stated in the aforementioned Soviet literature, a synthesis of dimethylthiophosphite is impossible.

On the other hand, the best process known hitherto for the preparation of dimethyl-thiophosphite, namely the reaction of dimethyl-phosphite with phosphorus pentasulfide, gives the desired product only in yields of about 30% of the theory, and is therefore not very economical.

It has now been found, in accordance with the present invention, that a versatile, simple and smooth process may be provided for the production in favorably high, i.e. outstanding, yields and high purity of dimethyl-thiophosphite or organothiophosphonous acid O-monomethyl esters of the general formula:

(Ia)

in which

R is an organo radical, e.g. hydrocarbon radical, such as lower alkyl preferably with 1 to 4, or 1 to 2, carbon atoms, especially methyl, ethyl, n- and iso-propyl, n-, iso-, sec.- and tert.-butyl, and the like, or a phenyl radical;

which comprises reacting correspondingly trimethyl-phosphite or organo-phosphonous acid O,O-dimethyl ester of the formula:

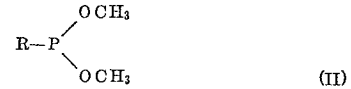

(II)

in which

R is the same as defined above, with hydrogen sulfide in the presence of weak organic bases (the pKa of which in aqueous solution is approximately from 0.5 to 8) as catalyst at a temperature of from substantially between about 0 to 70° C. and at a pressure from substantially between about 1 to 65 atmospheres absolute.

Hence, the present invention provides a process for the production of dimethyl-thiophosphite or an organo-thiophosphonous acid O-mono-methyl ester under conditions which are readily attainable in industry, in simple manner and good purity and with outstanding yields, in which trimethyl-phosphite of an organo-phosphonous acid O,O-dimethyl ester (i.e. starting phosphorus compound) is reacted with hydrogen sulfide and a weak organic base (the pKa of which in aqueous solution is approximately from 0.5 to 8) at a temperature of from about 0 to 70° C., and at a starting pressure from about 1 to 65 atmospheres absolute.

The smooth and uniform course of the reaction according to the present invention is completely surprising; for in the work by Achmetchanov et al. mentioned above, dimethylaniline, which has proved suitable as a weak organic base catalyst in the reaction according to the present invention, is described as having little effect as catalyst (. . . "only a very small amount of diethyl-thiophosphite is formed").

On the other hand, the triethyl-amine used with success by the Soviet authors, if tried for the synthesis of dimethyl-thiophosphite according to the present invention, is completely unusable; on the contrary, as can be seen from comparative Example III hereinbelow, the reaction product is even decomposed by this amine.

It is also surprising that, in accordance with the process of the present invention, aniline can be used too, for it was to be expected that the dimethyl-thiophosphite (which is known as a very good alkylating agent) would have an alkylating effect on this aromatic amine under the conditions of the reaction.

Organic bases suitable as catalysts for the process according to the present invention are preferably those amines which are usually described as weak, i.e. weak organic bases or weak amines, the pKa of which in aqueous solution is approximately from 0.5 to 8 (compare "Handbook of Chemistry and Physics," 48th Edition 1967/68, pages D 87/88). While the reaction proceeds only very slowly in the case of very small pKa values, for example, in the case of the reaction of diphenyl-amine (pKa=0.79); with high pKa values there may occur, in certain circumstances, very considerable decomposition. Particularly good results in the process have been obtained with, above all, those amines with pKa values of from 4 to 7, for example aniline (pKa=4.63); lower alkyl-anilines, e.g. $C_{1-4}$ alkylanilines such as dimethyl- (pKa=4.23) and diethyl-aniline (pKa=6.81); pyridine (pKa=5.25) and its substitution products especially its lower alkyl, substitution products such as mono and di $C_{1-4}$ alkyl, e.g. 2-ethyl pyridine (pKa=5.89), picolines, i.e. 2-, (pKa=5.97); 3- (pKa=5.68) and 4-methyl pyridine (pKa=6.02), and collidine (pKa=7.43), i.e. 4-ethyl-2-methyl-pyridine, 3-ethyl-4-methyl-pyridine and 2,4,6-trimethyl-pyridine; and tris-hydroxy-isopropyl-amine (pKa=6.5, own measurement); and the like. It is not important whether the amines are primary, secondary or tertiary, or whether they are sterically hindered or not (see Example 5 hereinbelow).

The production process according to the present invention is preferably carried out in the absence of solvents or diluents.

The reaction may be carried out within a fairly wide temperature range. In general, the work is carried out at substantially between about 0–70° C. Preferably, elevated temperatures are used (about 40 to 70° C.); in this case, the reaction time which, depending on the nature of the components to be reacted, is usually 8 to 48 hours, can be shortened substantially, that is by about 60 to 80%.

Furthermore, it is in principle possible to allow the reaction to proceed at normal pressure, but working under greater than normal starting pressure has proved advantageous when carrying out the process on an industrial scale. The starting pressure may therefore range substantially between about 0 to 64 atmospheres gauge. Particularly expedient are starting pressures from about 0.1 to 55 atmospheres gauge (saturation pressure of the hydrogen sulfide), and above all from 5 to 35 atmospheres gauge. In the course of the reaction the pressure diminishes; if no $H_2S$ excess is present, the pressure can even fall to 1 atmosphere absolute.

The amount of weak organic base to be used is not critical. Whereas when only a few mol percent, based on the starting phosphorus compound, e.g. 2–5 mol percent, are used the reaction proceeds distinctly more slowly, in the case of the use of 10 to 50 mol percent, with reference to the starting phosphorus compound provided, no substantial change of the reaction speed is observed. 100 mol percent or more of such amine can naturally be used, but such a quantity renders the working up of the mixture difficult, without giving any particular advantage. Therefore, the amount of weak organic base used may range substantially between about 2–125, and preferably 10–50, mol percent, based on the starting phosphorus compound.

In accordance with one particular embodiment of the present invention, the amount of weak organic base used may range substantially between about 75–125, mol percent, based on the starting phosphorus compound.

The amount of hydrogen sulfide to be used should preferably be at least 100 mol percent, with reference to the organo-phosphorus component, i.e. starting phosphorus compound. An excess of 10 to 30 mol percent is more preferable; greater excesses may, however, be disadvantageous, because carrying out the reaction and working up of the mixture may thereby be rendered difficult. Therefore, the amount of hydrogen sulfide used may range substantially between about 100–130 mol percent, based on the starting phosphorus compound.

After completion of the reaction, the reaction mixture is worked up by distillation, or by extraction of the amine and the methanol formed with an aqueous solution of a strong inorganic acid (a dilute mineral acid), e.g. hydrochloric, sulfuric, nitric, etc., acid.

A distinct advantage of the process according to the present invention compared to the known methods is, besides the advantages already mentioned above (i.e. good yields, high purity of the products, etc.), above all the fact that it can be carried out under industrial conditions.

Furthermore, besides the known trimethyl-phosphite, the appropriate O-monomethyl esters of organo-phosphonous acids, all of which are also known, in particular the alkane- and benzene-phosphonous acid methyl esters concerned, can also be reacted according to the instant process, whereby organo-, above all lower alkane-, for example methane- and ethane- and benzene-thiophosphonous acid O-monomethyl ester, may be readily prepared on an industrial scale (see Example 7 hereinbelow).

As already mentioned above, on the basis of the particulars given by Achmetchanov et al. there is formed, in the reaction of triethyl-phosphite with hydrogen sulfide, an initial ionic addition product which under the conditions of the subsequent distillation splits into diethyl-thiophosphite and ethanol.

On the other hand, in the process according to the present invention, it is possible to isolate the dimethyl-thiophosphite without distillation from the reaction mixture. It follows from this, advantageously, that when preparing DMTP according to the instant process an analogous addition product does not occur.

Dimethyl-thiophosphite, like the organo-phosphonous acid O-monomethyl ester also obtainable according to the instant process, is a valuable known starting material for the obtaining of known biocidal, e.g. insecticidal, compounds based on phosphoric acid esters, as the artisan will appreciate and as disclosed for instance in U.S. Pat. Nos. 2,897,227, 3,056,825, 3,156,718, and 3,277,214

The following Examples 1 to 7 illustrate, without limitation, the production process of the present invention, and Comparative Examples I to IV demonstrate the effectiveness of the conditions under which the instant process is carried out.

EXAMPLE 1

248 g. trimethyl-phosphite (2 mols), 150 g. diethyl-aniline (1 mol) and 82 g. hydrogen sulfide (2.4 mols) are heated at 50° C. for 24 hours in a 1-liter autoclave. The starting pressure of about 24 atmospheres gauge falls after 18 hours to 6, and after 24 hours to 4.8, atmospheres gauge. In the subsequent distillation under reduced pressure there are obtained: 61 g. methanol (95% of the theory), 203 g. dimethyl-thiophosphite of B.P. 21° C./2 mm. Hg (80.5% of the theory) and a residue of 159 g. which contains 94% of diethyl-aniline (analysis by gas chromatography).

EXAMPLE 2

248 g. trimethyl-phosphite (2 mols), 75 g. diethyl-aniline (0.5 mol) and 85 g. hydrogen sulfide (2.5 mols)

are heated at 50° C. for 24 hours in the same way as in Example 1. The subsequent distillation under reduced pressure yields 59 g. methanol (92% of the theory), 230 g. dimethyl-thiophosphite of B.P. 25° C./2.5 mm. Hg (91.3% of the theory) and 80 g. of a residue which consists of 93% of diethyl-aniline.

EXAMPLE 3

248 g. trimethyl-phosphite (2 mols), 75 g. hydrogen sulfide (2.2 mols) and 79 g. pyridine (1 mol) are heated for 24 hours to 40° C. in an autoclave. The yield of dimethyl-thiophosphite in the subsequent distillation under reduced pressure is 72% of the theory.

EXAMPLE 4

A mixture of 248 g. trimethyl-phosphite (2 mols), 82 g. hydrogen sulfide (2.4 mols) and 94 g. aniline (1 mol) is heated at 60° C. for 20 hours. In the subsequent distillation, 201 g. dimethyl-thiophosphite of B.P. 25° C./2.5 mm. Hg are obtained, corresponding to a yield of 81.5% of the theory.

EXAMPLE 5

69 g. trimethyl-phosphite (0.5 mol), 48 g. trishydroxy-iso-propyl-amine (0.25 mol) and 19 g. hydrogen sulfide (0.56 mol) are reacted at 13° C. for 17 hours. In the subsequent distillation, 28 g. (44.5% of the theory) di-methyl-thiophosphite are obtained (tris-hydroxyisopropyl-amine is a sterically greatly hindered, weak base, the pKa of which is about 6.5).

EXAMPLE 6

248 g. trimethyl-phosphite (2 mols), 85 g. hydrogen sulfide (2.5 mols) and 150 g. diethyl-aniline (1 mol) are heated at 50° C. for 24 hours in an autoclave of alloy steel. The initial pressure is 25 atmospheres gauge; after 15 hours it has fallen to 8, and after 24 hours it has fallen to 5, atmospheres gauge. 650 ml. of n-pentane are added to the completely reacted reaction mixture and the latter is treated, at 0 to —5° C., with stirring, with a mixture of 650 ml. of water and 78 ml. of concentrated hydrochloric acid. The aqueous phase, after mixing, has a pH of about 1. The organic layer is separated, washed twice with, in each case, 250 ml. of water, and the pentane is evaporated. The residue consists of 209 g. dimethyl-thiophosphite (83% of the theory) the purity of which, determined by gas chromatography, is 99.5%.

265 ml. of a 50% solution of sodium hydroxide are added to the aqueous phase and the organic phase formed is separated. 145 g. of practically pure diethyl-aniline are recovered in this manner.

EXAMPLE 7

105 g. ethane-phosphonous acid O,O-dimethyl ester (0.86 mol), 35 g. hydrogen sulfide (1 mol) and 65 g. diethylaniline (0.43 mol) are heated to 40° C. for 24 hours. The pressure rises to a maximum of 8 atmospheres gauge. By subsequent distillation under reduced pressure 25 g. methanol (91% of the theory) and 90 g. (85% of the theory) of ethane-thiophosphonous acid O-monomethyl ester of B.P. 31° C./1.5 mm. Hg are obtained. On the basis of a gas chromatograph, the product is 95.1% pure ethane-thiophosphonous acid O-monomethyl ester.

COMPARATIVE EXAMPLE I 124 g. trimethyl-phosphite (1 mol), 50 g. triethyl-amine (0.5 mol) and 38 g. hydrogen sulfide (1.1 mol) are placed in a 1-litre autoclave of alloy steel and the mixture is left to stand for 65 hours at 0° C.

By subsequent distillation under reduced pressure, only small amounts of methylmercaptan and methanol are obtained. Even when the residue is heated up to 90° C., no dimethyl-thiophosphite distills off. There remains behind a malodorous residue.

COMPARATIVE EXAMPLE II

A mixture of 124 g. trimethyl-phosphite (1 mol), 90 g. tri-n-butyl-amine (0.49 mol) and 36 g. hydrogen sulfide (1.1 mol) is allowed to stand for 20 hours at 13° C. in a 1-litre autoclave. In the subsequent distillation under reduced pressure, no dimethyl-thiophosphite is obtained.

COMPARATIVE EXAMPLE III 5 g. dimethyl-thiophosphite (0.5 mol) are heated at 40° C. for 12 hours alone or with, in each case, 0.5 ml. triethylamine, diethyl-aniline or pyridine.

Whereas the test specimens of dimethyl-thiophosphite alone and the mixtures with diethyl-aniline and pyridine are, after this time, externally unchanged and the infra-red spectrum also shows no modification with respect to the starting state, the mixture with triethyl-amine contains, afer the heating, a brown precipitate, and exhibits in infra-red spectroscopic investigation a strong P=O double bond band.

COMPARATIVE EXAMPLE IV 124 g. trimethyl-phosphite (1 mol), 38 g. hydrogen sulfide (1.1 mol) and 65 g. ethyl-di-isopropyl-amine (0.5 mol)-[Hünig's base] are left to stand for 17 hours at 13° C. By subsequent distillation under reduced pressure, no dimethylthiophosphite is obtained. (Hünig's base is a stearically greatly hindered, but strong, amine.)

It will be appreciated that the instant specification and examples are set forth by way of illustration and not limitation, and that various modifications and changes may be made without departing from the spirit and scope of the present invention.

What is claimed is:

1. Process for the production of a phosphorus compound, selected from the group consisting of dimethyl-thiophosphite and organo-thiophosphonous acid O-methyl ester, of the formula

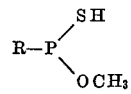

in which R is selected from the group consisting of lower alkyl with 1 to 4 carbon atoms and phenyl, which comprises reacting correspondingly a starting member, selected from the group consisting of trimethyl-phosphite and an organo-phosphonous acid O,O-dimethyl ester, of the of formula

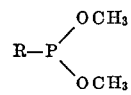

in which R is the same as defined above, with hydrogen sulfide in the presence of a weak organic base, the pKa of which in aqueous solution is substantially between about 4–8, as catalyst at a temperature between about 0–70° C. and at a starting pressure between about 1–65 atmospheres absolute, to form the corresponding compound.

2. Process according to claim 1 where said pKa is between about 4–7.

3. Process according to claim 1 wherein said temperature is between about 40–70° C. and said starting pressure is between about 0.1–55 atmospheres gauge.

4. Process according to claim 1 wherein said weak organic base is present in an amount between about 2–125 mol percent based on said starting member.

5. Process according to claim 1 wherein said weak organic base is present in an amount between about 10–50 mol percent based on said starting member.

6. Process according to claim 1 wherein said hydrogen sulfide is used in an amount between about 100–130 mol percent based on said starting member.

7. Process according to claim 1 wherein said weak organic base is selected from the group consisting of aniline, lower alkyl anilines, diphenyl amine, pyridine, lower alkyl pyridines, and tris-hydroxy isopropyl amine.

8. Process according to claim 1 wherein said weak organic base is selected from the group consisting of aniline, dimethyl aniline, diethyl aniline, diphenyl amine, pyridine, methyl pyridine, ethyl pyridine, methyl-ethyl pyridine, trimethyl pyridine, and trishydroxyisopropyl amine.

9. Process according to claim 1 wherein said starting member is trimethylphosphite.

10. Process according to claim 1 wherein said starting member is lower alkyl-phosphonous acid O,O-dimethyl ester.

11. Process according to claim 1 for the production of a phosphorus compoud selected from the group consisting of dimethyl-thiophosphite and lower alkyl-thiophosphonous acid O-methyl ester, which comprises reacting correspondingly a starting member selected from the group consisting of trimethylphosphite and lower alkyl-phosphonous acid O,O-dimethyl ester, with hydrogen sulfide in an amount of substantially between about 100–130 mol percent based on said starting member, in the presence of a weak organic base, the pKa of which in aqueous solution is substantially between about 4–8, as catalyst in an amount of substantially between about 2–125 mol percent based on said starting member at a temperature between about 0–70° C. and at a starting pressure between about 1–65 atmospheres absolute, to form the corresponding phosphorus compound.

12. Process according to claim 1 wherein said starting member is trimethylphosphite, said pKa is between about 4–7, said temperature is between about 40–70° C., said starting pressure is between about 0.1–55 atmospheres gauge, and said weak organic base is present in an amount of between about 10–50 mol percent based on said starting member, whereby to form dimethyl-thiophosphite.

13. Process according to claim 11 wherein said starting member is lower alkyl-phophonous acid O,O-dimethyl ester having 1–4 carbon atoms in the corresponding lower alkyl radical, said pKa is between about 4–7, said temperature is between about 40–70° C., said pressure is between about 0.1–55 atmospheres gauge, and said weak organic base is present in an amount of between about 10–50 mol percent based on said starting member, whereby to form the corresponding lower alkyl-thiophosphonous acid O-methyl ester having 1–4 carbon atoms in the particular lower alkyl radical.

14. Process according to claim 11 wherein said weak organic base is selected from the group consisting of aniline, dimethyl aniline, diethyl aniline, diphenyl amine, pyridine, methyl pyridine, ethyl pyridine, methyl-ethyl pyridine, trimethyl pyridine, and tris-hydroxyisopropyl amine..

15. Process according to claim 11 wherein the resulting phosphorus compound is recovered free from attendant weak organic base and methanol formed during the reaction by extracting the reaction mixture with a aqueous solution of a strong inorganic acid.

References Cited

Achmelcanov et al.: "Dokl. Akad. Nauk, SSSR," vol. 163, No. 2, pp. 362–364 (1965).

JOSEPH REBOLD, Primary Examiner

A. H. SUTTO, Assistant Examiner

U.S. Cl. X.R.

260—961